US008532687B2

(12) United States Patent
Dimpflmaier et al.

(10) Patent No.: US 8,532,687 B2
(45) Date of Patent: Sep. 10, 2013

(54) METHODS FOR GEOGRAPHIC OPTIMIZATION OF CELLULAR TELEPHONE TRANSMIT POWER SETTINGS (75) Inventors: Ronald William Dimpflmaier, Los Gatos, CA (US); William Jean Noellert, Mountain View, CA (US); Jesse Yu, San Jose, CA (US); Nicholas W. Lum, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 579 days.

(21) Appl. No.: 12/633,530

(22) Filed: Dec. 8, 2009

(65) Prior Publication Data

US 2011/0136493 A1  Jun. 9, 2011

(51) Int. Cl.
*H04M 11/04* (2006.01)
*H04M 1/64* (2006.01)
*H04M 1/56* (2006.01)
*H04M 15/06* (2006.01)
*H04B 1/16* (2006.01)
*H04B 7/00* (2006.01)
*H04W 24/00* (2009.01)
*H04W 4/00* (2009.01)
*H04L 12/26* (2006.01)
*H04L 25/03* (2006.01)
*H04L 25/49* (2006.01)
*H04K 1/02* (2006.01)
*G06F 11/30* (2006.01)
*G21C 17/00* (2006.01)

(52) U.S. Cl.
USPC ..... 455/522; 455/404.2; 455/440; 455/456.1; 370/252; 370/331; 370/338; 375/296; 379/88.25; 379/142.1; 702/186

(58) Field of Classification Search
USPC ............. 455/404.1, 404.2, 433, 440, 456.1, 455/456.2, 456.3, 456.4, 456.5, 456.6, 457, 455/450, 451, 452.1, 522; 375/279; 379/14.1, 379/88.25, 142.1, 207.12; 701/214, 215, 701/216; 713/400; 702/186
See application file for complete search history.

(56) References Cited

U.S. PATENT DOCUMENTS 5,276,912 A * 1/1994 Siwiak et al. .................. 455/73
6,138,245 A * 10/2000 Son et al. ...................... 713/400

(Continued)

OTHER PUBLICATIONS

"Cellular network" [online]. Wikipedia., [retrieved on Oct. 19, 2009]: <URL: http://en.wikipedia.org/wiki/Cellular_network>.

(Continued)

*Primary Examiner* — Fayyaz Alam
*Assistant Examiner* — Paul P Tran
(74) *Attorney, Agent, or Firm* — Treyz Law Group; Jason Tsai (57) ABSTRACT

Portable user devices are provided that communicate wirelessly with base stations. A user device may include a transceiver, a power amplifier, a voltage supply, and a global positioning system (GPS) unit. The device may transmit signals at a certain transmit power to a neighboring base station. The device may log the time spent transmitting at each power level. Each data point may be tagged with the current location of the device. The logs of each device may be aggregated by a power optimization server. The power optimization server may calculate optimum power settings for each region and for each type of device. A region may be any desirable size ranging from the size of a single cell to an entire continent. Device users may download updated optimum settings. A device may automatically detect and select the optimum transmit power setting during operation depending on its current location.

7 Claims, 7 Drawing Sheets

(56) References Cited

U.S. PATENT DOCUMENTS

| | | |
|---|---|---|
| 6,516,195 B1 | 2/2003 | Zadeh et al. |
| 6,754,470 B2 * | 6/2004 | Hendrickson et al. ...... 455/67.11 |
| 6,845,246 B1 * | 1/2005 | Steer ............................. 455/522 |
| 7,853,282 B2 * | 12/2010 | Wu et al. ....................... 455/522 |
| 2003/0096629 A1 * | 5/2003 | Elliott et al. .................. 455/522 |
| 2006/0276201 A1 * | 12/2006 | Dupray ...................... 455/456.1 |
| 2007/0253578 A1 * | 11/2007 | Verdecanna et al. .......... 381/104 |
| 2007/0263587 A1 | 11/2007 | Savoor et al. |
| 2007/0291872 A1 * | 12/2007 | Chan et al. .................... 375/297 |
| 2009/0163238 A1 * | 6/2009 | Rao et al. ....................... 455/522 |
| 2009/0325592 A1 * | 12/2009 | Jang et al. ................... 455/456.1 |
| 2010/0015926 A1 * | 1/2010 | Luff ........................... 455/67.13 |
| 2010/0112967 A1 * | 5/2010 | Sorensen .................... 455/127.2 |
| 2010/0304755 A1 * | 12/2010 | Rice et al. .................. 455/456.1 |
| 2010/0330919 A1 * | 12/2010 | Gurney et al. ............. 455/67.11 |

OTHER PUBLICATIONS

Cell site [online]. Wikipedia., [retrieved on Oct. 19, 2009]: <URL: http://en.wikipedia.org/wiki/Cell_site>.

* cited by examiner

METHODS FOR GEOGRAPHIC OPTIMIZATION OF CELLULAR TELEPHONE TRANSMIT POWER SETTINGS

BACKGROUND

This invention relates to wireless communications, and more particularly, to wireless communications in networks such as cellular networks.

A cellular network is a wireless network that includes multiple cells and base stations. Base stations are towers for mounting antennas, transceivers, and other wireless communications equipment. Each cell is served by one or more respective base stations. Base stations are sometimes referred to as cell sites, cell towers, base transceiver stations (BTS), etc. In a typical cellular network, base stations may be located close to one another (e.g., ¼-½ mile apart) or far away from one another (e.g., 1-2 miles apart). Base station spacing generally depends on the number of active users served by each base station and considerations such as cell site topography.

Cellular base stations provide radio coverage for user equipment (UE) such as portable user devices. An example of a portable user device is a mobile phone that is used to make telephone calls. The user device may communicate wirelessly with a neighboring base station that is providing radio coverage. Base stations may collectively provide radio coverage that covers a wide geographic region. The radio coverage of each cell may be approximately circular. The radio coverage of each cell typically overlaps with the radio coverage at least one other cell to provide a continuous region of radio coverage for the cellular network. The amount of overlap between adjoining cells should generally not be too large to minimize waste and to minimize potential interference among the cells.

A cellular network implemented using a wireless telephony protocol such as the Global System for Mobile communications (GSM) protocol or a code division multiple access (CDMA) protocol. Regardless of what technology is used, user devices should be able to move from cell to cell (e.g., the wireless technology should support a handover mechanism) without losing wireless connectivity.

User devices such as mobile phones are typically designed to operate over a range of possible transmit powers. Wireless communications systems use transmit power control (TPC) commands to control the transmit powers of user devices in the system. Consider a first scenario in which a user device is transmitting at maximum power levels to a base station. If there are other devices that are also communicating with the base station, the signal transmitted by the user device may be too strong and may interfere with the signals transmitted by the other devices. If the full power of the devices is not required for satisfactory communications, the base station may send a TPC command that instructs the user device to transmit at a lower power level. By reducing transmit powers whenever possible, interference can be reduced and the number of simultaneous users can be maximized. Reduction in transmit power may be common in urban regions that have dense populations of active user devices and short distances between cell towers.

In contrast, consider a second scenario in which a user device is transmitting at a low power. If the transmit power is too weak, the base station may not be able to properly receive the transmitted signal from the user device. In this scenario, the base station may send a TPC command that tells the user device to transmit at a higher power level. Operation at higher powers may be common in suburban regions that have sparser populations of active user devices relative to urban regions. Because not as many user devices are simultaneously communicating with a given base station and because cell signals must travel greater distances, user devices may transmit at higher powers.

Because of the differences in topology and cell usage patterns in different geographic locations, cellular telephones tend to operate at different powers in different environments. For example, cellular telephones in urban environments may tend to operate at lower transmit powers than cellular telephones in suburban areas. Each different type of operating environment may, in general, be characterized by its own unique set of cellular telephone transmit power statistics.

In conventional networks, cellular telephones are provided with a single set of transmitter settings. These settings dictate how the cellular telephone transmits cellular signals under different conditions. For example, the transmitter settings may dictate that low transmit powers should be produced by activating a single radio-frequency power amplifier gain stage in the cellular telephone, whereas high transmit powers should be produced by activating two radio-frequency power amplifier gain stages.

Although use of a generic set of transmitter settings for all cellular telephones in a cellular telephone network may be straightforward to administer, inefficiencies and performance issues may arise during operation. In particular, the generic transmitter settings might result in high call quality in suburban environments or other environments where transmit powers tend to be high, but may result in suboptimal call quality in urban environments. As another example, the generic transmitter settings might result in excellent transmitter power efficiency performance in urban environments, but might exhibit lower than desired transmitter power efficiency performance in suburban environments.

Because call quality and power consumption must be acceptable for all users, the generic transmitter settings that networks use represent a compromise. Settings are not optimized for either urban or suburban environment, but rather are selected so that adequate performance is obtained on average.

Although use of generic transmitter settings is generally satisfactory, recent advances in cellular telephones are placing increasing demands on cellular networks and cellular telephone manufacturers. Increased cellular telephone usage is giving rise to a greater potential for interference between devices. Battery life is also of growing importance, because users are using their cellular telephones to browse the Internet and handle other power-intensive tasks.

It would therefore be desirable to be able to provide ways in which to optimize the performance of wireless networks and wireless electronic devices such as cellular telephones.

SUMMARY

Electronic devices such as portable user devices may communicate wirelessly with a nearby base station. A user device may include storage and processing circuitry, a transceiver, a power amplifier, a voltage supply, Global Positioning System (GPS) unit, etc. The user device may be used to transmit wireless signals with a certain transmit power. The transceiver may be adjusted to change the transmit power. The power amplifier may have a varying number of amplifying stages and may be biased at a tunable bias voltage. The power amplifier may be tuned to change the transmit power as well.

Each user device may keep a log that records the transmit power at different points in time. Each data point may also be tagged with the current corresponding location of the user device. The current location of the user device may be determined by the GPS unit, a base station identifier, a wireless hotspot identifier, etc.

A user may dock his user device and may connect the user device to a service account. The user device may upload its log to the service account. The uploaded logs of each user device may be aggregated to a central power optimization server. The power optimization server may continuously pull and store the logs of user devices from different geographical regions.

The power optimization server may organize the data into separate groups corresponding to the different regions (e.g., sorting the data according to the location tags). A region may be any desired geographical area (e.g., a city, a state, a country, etc.). Furthermore, the data may be organized according to the type (model) of user devices.

The power optimization server may calculate a cumulative distribution function (CDF) of transmit power based on the logs retrieved for each region and user device model. The CDF may be used to show the percentage of time that a typical user device spends transmitting wireless signals at various power levels. An optimum transmit power setting may be determined for each region and model type based on the CDF. The optimum transmit power setting may be a setting that is optimized to transmit power at a power level that corresponds to the peak of the CDF. A set of optimum transmit power settings may be calculated in this way for any number of regions.

At regular time intervals (e.g., once every few months), the power optimization server may update the optimum power settings based on the old optimum power settings and data gather from the newly retrieved logs since the previous update. A user may download the updated power settings by docking his device or by retrieving the optimum settings through a wireless network. A user may download the optimum settings for the entire world or may download a subset of the optimum settings that corresponds to the region in which the user resides.

When the user device is in use, the user device may calculate its current location using the base station identifier, for example. Based on the current location, the user device may operate at the corresponding optimum transmit power settings. A user device configured in this may be more power efficient. It is important to note that once the user moves to another region, the optimum transmit power settings may be changed to reflect the settings that are suitable for the new location. In a scenario in which a user device has downloaded a subset of optimum settings that does not include the optimum settings for a given location, the user device may still be able to retrieve the appropriate transmit power settings wirelessly.

Further features of the user device, its nature and various advantages will be more apparent from the accompanying drawings and the following detailed description.

DETAILED DESCRIPTION

This relates to cellular networks and wireless electronic devices such as cellular telephones that communicate within cellular networks.

A cellular network is a radio network that is made up of a group of cells. Each cell includes a base station that provides wireless coverage for that cell. A base station may be a tower. Antennas, transceivers, and other wireless communications equipment may be mounted on the tower to provide wireless communications capabilities. A base station may therefore be referred to as a cell tower, a cell site, a base transceiver station (BTS), etc. A base station may be located at the center of each cell. Using a network of base stations, a cellular telephone operator may provide wireless coverage for cellular telephones over a wide area.

Multiple cells may be located throughout a geographic region to provide wireless coverage for that geographic region. The wireless coverage of each cell may partly overlap with the wireless coverage of at least one other cell to provide continuous or nearly continuous wireless coverage.

Each base station can support only a finite number of simultaneous users. As a result, different geographic regions are typically provided with different cell densities. Regions that have more dense concentrations of active users (e.g., urban regions) may require base stations to be placed closer together (e.g., with a smaller radius of coverage for each cell). Regions that have less dense concentrations of active users (e.g., suburban regions) may be provided with base stations that are located farther apart from each other.

Cellular carriers typically offer cellular coverage that spans a variety of geographic areas. For example, national cellular carriers offer coverage in urban areas, suburban areas, and rural areas. The characteristics of a cellular network can also vary within areas of these types. For example, some suburban areas may be relatively flat and spread out whereas other suburban areas may be hilly and compact.

To enhance operation of a cellular telephone or other portable user device that is wirelessly communicating with a base station in a cellular network, the way in which the device operates can be adjusted as a function of its environment. In particular, the settings of the user device may be optimized so that the device operates differently depending on the characteristics of the cellular network in which the user device is currently located. When, for example, a device is located in a wireless network of a first type (e.g., an urban network), the device may use a first set of settings (e.g., a first set of radio-frequency power amplifier settings). When the device is located in a wireless network of a second type (e.g., a suburban network), the device may use a second set of settings (e.g., a second set of radio-frequency power amplifier settings). Because operation of the device is tailored to the location of the device, performance can be enhanced relative to devices that use the same set of settings in all portions of a network.

Figure 1:
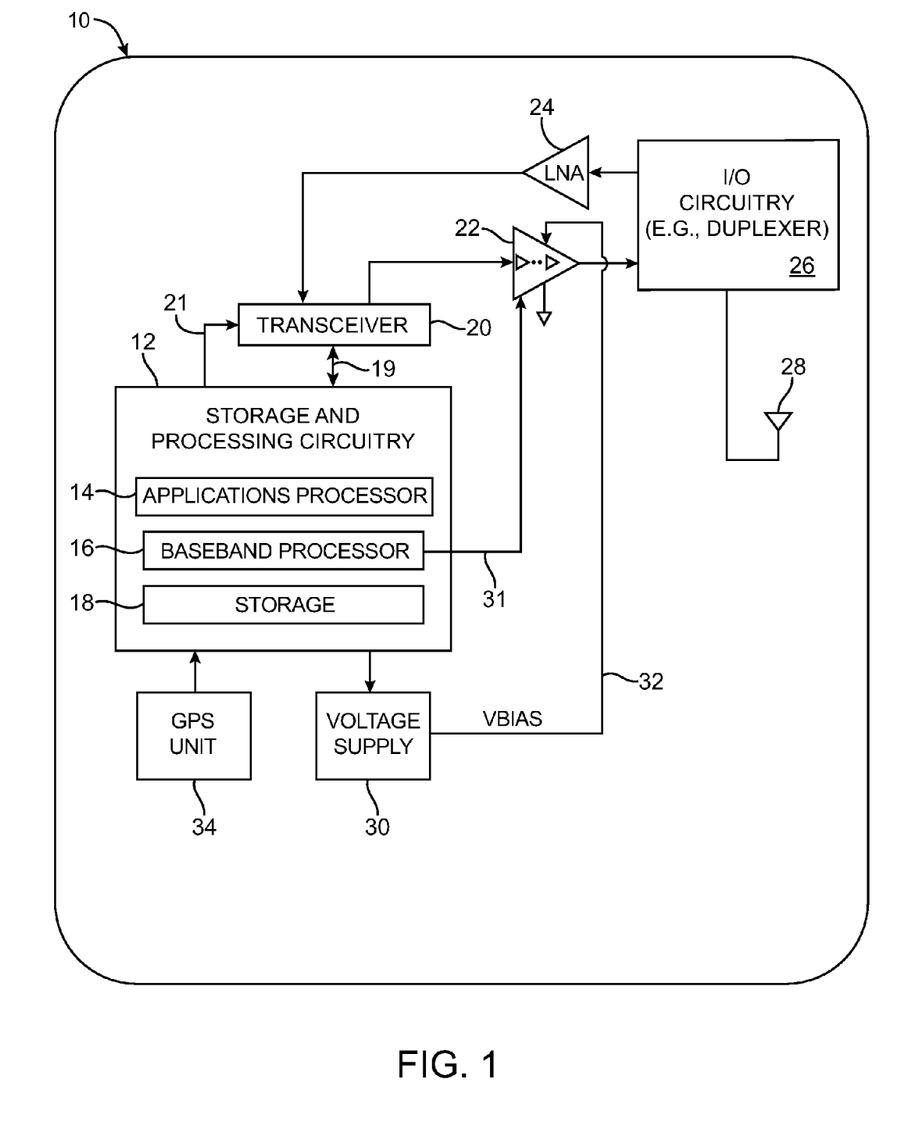
FIG. 1 is a schematic diagram of circuitry located within a wireless electronic device such as a cellular telephone in accordance with an embodiment of the present invention.

A cellular telephone or other electronic device such as user device 10 of FIG. 1 may be provided with location-specific settings. User device 10 may be a mobile telephone, computing equipment such as a handheld electronic device, tablet computer, or laptop computer, or other wireless device that communicates with a cellular telephone network. Device 10 may use wireless communications to handle voice traffic and/or data traffic.

Device 10 may include storage and processing circuitry such as storage and processing circuitry 12. Storage and processing circuitry 12 may include an applications processor such as applications processor 14, a baseband processor such as baseband processor 16, and storage circuitry such as storage circuitry 18. Additional processors such as digital signal processing chips, application-specific integrated circuits, and other processing components may be included in circuitry 12. Applications processor 14 and baseband processor 16 may be used to perform digital signal processing operations for device 10. For example, applications processor 14 may be used to execute software for implementing a web browser, email application, or other applications. Baseband processor 16 may be coupled to transceiver circuitry such as transceiver 20 and may be used in transmitting and receiving signals over antenna 28. Storage circuitry 18 may include volatile and nonvolatile memory, hard drives, and other storage media and may be used in storing data for the processing components in circuitry 12.

Storage and processing circuitry 12 may be connected to a transceiver such as transceiver 20 through data path 19. Storage and processing circuitry 12 may send and receive digital signals to and from transceiver 20 through data path 19. Transceiver 20 may also be controlled by storage and processing circuitry 12 through control line 21. Control line 21 may be used to control the rate at which transceiver 20 is processing data and other transceiver settings.

Transceiver 20 may have an input port and an output port. The output port of transceiver 20 may be connected to an input terminal of a radio-frequency power amplifier (PA) such as power amplifier 22. Power amplifier 22 may be used to amplify the radio-frequency signals provided by transceiver 20 prior to transmitting the signals through antenna 28. Power amplifier 22 may have multiple amplifying stages. The number of amplifying stages that are turned on and active may be controlled in real time using control signals applied to power amplifying control line 31. Control line 31 may be connected to an output of baseband processor 16 (or, if desired, the output of other processing circuitry such as applications processor 14). Power amplifier 22 adjusted by control line 31 so that only a single amplifying stage is active or may be adjusted so that two stages are active or so that three amplifier stages are turned on (as examples). It may be desirable to activate most or all of the stages in amplifier 22 in situations in which a large output power is desired. In situations in which less output power is needed, it may be desirable to turn off one or more of the stages of amplifier 22 to conserve power.

If the output power from transceiver 20 is sufficient without further amplification, power amplifier 22 may be bypassed (e.g., using switch circuitry). Power amplifier 22 may have an output terminal that is connected to input-output (I/O) circuitry such as I/O circuitry 26. Circuitry 26 may include switching circuitry (e.g., radio-frequency switches), radio-frequency filters (e.g., duplexers), tuning circuits (e.g., impedance matching circuits), etc. For example, circuitry 26 may contain a duplexer that routes signals by frequency. This allows antenna 28 to be shared between transmitter and receiver circuits.

The input port of transceiver 20 may be connected to an output terminal of a low noise amplifier (LNA) such as low noise amplifier 24. Low noise amplifier 24 may have an input terminal that is connected to I/O circuitry 26. Low noise amplifier 24 may be used to amplify received signals while generating low noise content.

I/O circuitry 26 may include a duplexer. A duplexer is a device that allows for bidirectional communication (e.g., transmitting and receiving wireless signals). I/O circuitry 26 may be connected to an antenna such as antenna 28. Antenna 28 may be used to broadcast and receive analog wireless signals. The duplexer isolates the transmit operation from the receive operation to allow the system to share a common antenna 28. I/O circuitry 26 may include other circuitry such as matching circuits, mixers, etc.

Storage and processing circuitry 12 may be connected to a power supply unit such as voltage supply 30. Voltage supply 30 may include biasing circuitry that can be used to provide a controlled (adjustable) output voltage. For example, voltage supply 30 may provide a control voltage VBIAS on bias line 32. Bias line 32 may be connected to a supply terminal of power amplifier 22. The level of VBIAS and the number of active gain stages in amplifier 22 represent adjustable settings that affect the way in which the wireless circuitry (and, more particularly, power amplifier 22 operates). Other wireless settings may also be adjusted (e.g., transceiver settings such as the output power produced by transceiver 20). For clarity, illustrative configurations in which storage and processing circuitry adjusts settings in power amplifier 22 such as the value of VBIAS and the number of active amplifier gain stages are sometimes described herein as an example. This is, however, merely illustrative. Any suitable wireless settings may be adjusted by storage and processing circuitry 12 if desired.

During operation of device 10, wireless settings may be adjusted in real time. For example, storage and processing circuitry 12 can turn on and off gain stages in response to required output power levels. VBIAS may also be adjusted depending on current operating conditions.

Further optimization may be obtained by adjusting at least some wireless circuitry settings based on information about the position of device 10. For example, storage and processing circuitry 12 may maintain information on the threshold powers that trigger the turning off and on of gain stages. Optimum values for the threshold power settings may be different when device 10 is to be used in an urban environment or a suburban environment. There may be one or more settings of this type in device 10. For example, there may be two, three, four, or more than four settings for which optimum location-dependent values may be ascertained. Although sometimes referred to as location-dependent values, optimum settings may be switched into use based on any suitable variable. As an example, device 10 may select optimum settings to use based on device location, the type of geographic region in which the device is operating (e.g., urban, suburban, rural), the type of topology of the current device location (flat, hilly, mountainous, urban canyons, etc.), other attributes of the current operating zone (i.e., whether or not an area is heavily or lightly populated, whether or not electrical interference is commonly present, etc.).

Particularly when the operation of device 10 can be optimized by selecting among sets of available settings such as these, it may be desirable to allow device 10 to determine its current location. Location information can also be inferred (e.g., from the location at which the user of device 10 resides, from information gathered through the cellular telephone network, from postal code information or city name information entered manually by the user, from information that the user sets up in an online database and that is subsequently downloaded into device 10, or from other suitable sources). With one suitable arrangement, device 10 may include a Global Positioning System (GPS) unit such as GPS unit 34 that is used to calculate the current location of device 10. GPS unit 34 may be connected to storage and processing circuitry 12, so that storage and processing circuitry 12 can look up appropriate wireless settings to use in real time, based on the current location data supplied by GPS unit 34.

During operation, device 10 transmits wireless signals at a transmit power that is influenced by a number of factors. These factors include the output power of the radio-frequency signals produced by transceiver 20, the number of gain stages that are active in amplifier 22, and the voltage bias VBIAS for amplifier 22 (as examples). As device 10 is used, the link quality with its nearest base station may vary. For example, device 10 may move closer or farther from the base station or the wireless link between device 10 and the base station may become clearer or weaker due to interference from objects or electromagnetic interference sources.

The cellular network can issue transmit power control (TPC) commands to regulate the transmit power of device 10 as device 10 communicates with a base station. If the base station senses that device 10 is transmitting with an unnecessarily high transmit power, the base station may send a TPC command to device 10 that directs device 10 to decrement its current transmit power level (e.g., by 1 decibel referenced to one milli-watt (dBm)). On the other hand, if the base station senses that device 10 is transmitting with undesirably weak transmit power, the base station may send a TPC command to device 10 that tells device 10 to increment its current transmit power (e.g., by 1 dBm). TCP commands may increment or decrement the transmit power by any desired incremental amount.

An urban region may have a dense population of user devices. The active user devices may all be constantly sending and receiving wireless signals from a corresponding base station. A base station in a dense urban region may not be able to handle a situation in which all mobile phones are transmitting at maximum power. The wireless signals transmitted at such high power may undesirably interfere with one another and may decrease the quality of the signals. The base station may therefore send TPC commands that decrease the transmit power of devices to minimum acceptable levels. These TPC commands can be sent during times when a particularly large number of users are making phone calls or may be sent without regard to traffic levels.

Figure 2:
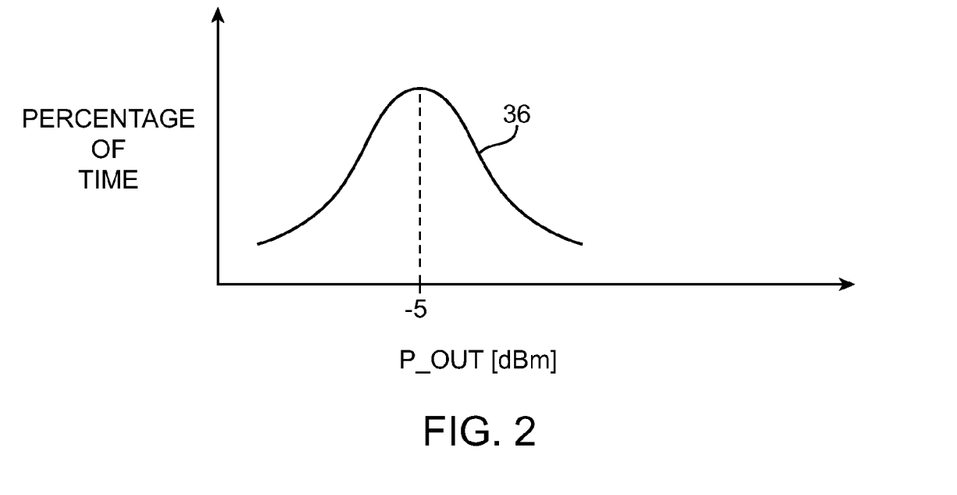
FIG. 2 is a graph of a cumulative distribution function of cellular telephone transmit power in an illustrative urban region in accordance with an embodiment of the present invention.

FIG. 2 shows a cumulative distribution function (CDF) of transmit power (P_OUT) for an urban region. The CDF illustrates the amount of time a user device spends transmitting at various power levels. From curve 36, one can see that a user device in the urban region may spend a high percentage of the time transmitting at −5 dBm (in this example). It is possible for device 10 to transmit at other power levels even in the urban region, as indicated by the other points on curve 36. For example, during busy hours, the base station may force each user device to operate at a low power level (e.g., less than −5 dBm). Alternatively, during times when users are not making as many phone calls, the base station may allow each mobile phone to transmit at a higher power level (e.g., greater than −5 dBm). Curve 36 can be obtained by logging P_OUT of each user device in a group of user devices operating in the urban area with respect to time. P_OUT with most data points will correspond to the peak of the curve while transmit levels with fewer data points will correspond to the other points on curve 36.

Figure 3:
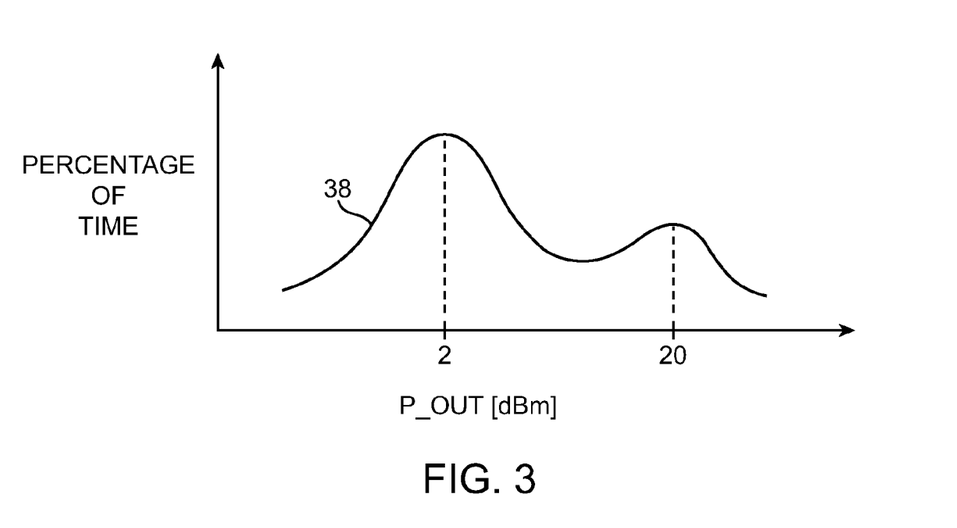
FIG. 3 is a graph of a cumulative distribution function of cellular telephone transmit power in an illustrative suburban region in accordance with an embodiment of the present invention.

The CDF for a group of devices may be fairly different if the devices are used in a suburban region, as shown in FIG. 3. According to curve 38 of FIG. 3, a typical user device in a suburban region may spend more time transmitting at 2 dBm than at any other transmit power levels (in this example). Notice that the peak of curve 38 corresponds to a higher transmit power than the peak of curve 36. As described previously, suburban regions tend to involve relatively more operation at higher power levels, because the density of users is relatively lower in comparison to urban regions and because users are farther from base stations. Curve 38 may also have a local peak at 20 dBm that corresponds to devices 10 operating at the outskirts of the suburban area, as an example. Once the characteristics of operating in a particular region are known (e.g., by collecting data for CDF curves such as curves 36 and 38 of FIGS. 2 and 3), it is possible to optimize wireless settings in a device accordingly. For example, empirical studies and modeling studies may be conducted to determine optimum threshold powers at which gain stages should be turned on and off in power amplifier 22 and optimum voltage bias values for VBIAS. In an urban region (or other type of operating environment), a first set of settings may produce best results for call quality and power consumption efficiency. In a suburban region (or other type of operating environment), a second set of settings may be preferable.

Any suitable criteria may be used to determine which settings are optimal. For example, emphasis may be placed on call quality or emphasis may be placed on power conservation. If desired, performance in urban areas may put emphasis on call quality (as an example) whereas performance in suburban areas may put emphasis on battery life (as an example). With one suitable arrangement, optimum performance may be obtained for each operating environment by choosing settings that are optimal when devices are operated at transmit power levels are at the peak of the appropriate CDF graph for that type of environment. For example, an optimal set of urban settings can be identified based on the assumption that urban devices will tend to operate at output power levels of −5 dBm, whereas an optimal set of suburban settings may be identified based on the assumption that suburban devices will tend to operate at higher power levels (see, FIG. 3).

Figure 4:
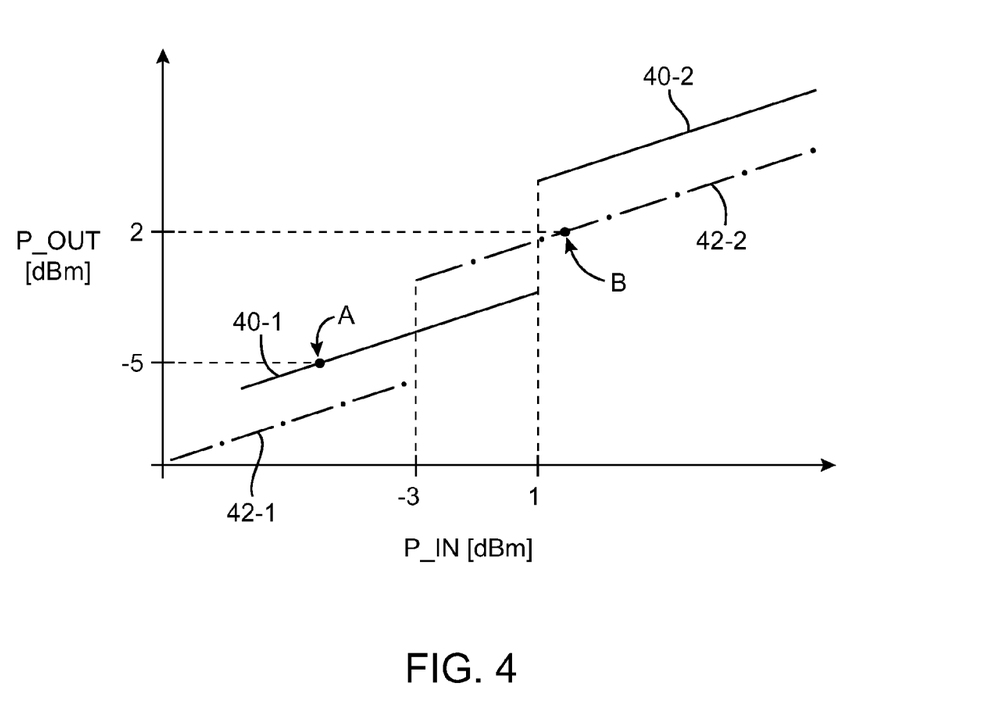
FIG. 4 is a graph of a power transfer function showing how a radio-frequency power amplifier in a wireless electronic device may operate as a function of transmitter settings and input power for two different power settings in accordance with an embodiment of the present invention.

User device transmit power settings may be adjusted. Each unique transmit power setting may correspond to a different power transfer function (e.g., transmit output power P_OUT versus input power P_IN), as shown in FIG. 4. Consider a first transfer function that includes curves 40-1 and 40-2. The first transfer function may have a first amplifier gain switch point at 1 dBm (e.g., the point at which the first transfer function is discontinuous). Point A on the first transfer function may correspond to a desired operating point optimized for operation in an urban region. Point A may correspond to a P_OUT of −5 dBm, for example. Point A may also be located adequately away from the first amplifier gain switch point. A VBIAS of 2 volts (V) may be used to bias power amplifier 22 to obtain the first transfer function. Control path 31 may be used adjust the number of amplifying stages in power amplifier 22 and to tune P_IN (e.g., to adjust the operating point along curve 40). For example, curves 40-1 and 40-2 may correspond to operating points generated by one and two amplifying stages in power amplifier 22 respectively. Thus, point A only requires power amplifier 22 to use a single amplifying stage, because point A sits on curve 40-1.

The first transfer function in this example is not necessarily optimized for use in a suburban region. For operation in suburban environments, a second transfer function may be used. The second transfer function may include curves 42-1 and 42-2 of FIG. 4. The second transfer function may have a second amplifier gain switch point at −3 dBm (as an example). The second transfer curve may be optimized to transmit power at a higher level that is suitable for suburban regions. For example, point B on the second transfer curve may correspond to a desired operating point suitable for operation in a given suburban region. Point B may correspond to a P_OUT of 2 dBm. Curves 42-1 and 42-2 may correspond to operating points generated using either one or two amplifying stages in power amplifier 22, respectively.

Because point B is located to the right of the second amplifier gain switch point, point B corresponds to a situation in which two amplifying stages are being used. The use of two amplifying stages instead of a single stage may allow a lower VBIAS of 1.5 V to be used (a lower VBIAS shifts a transfer function vertically downwards).

The first and second transfer functions may correspond to optimum power settings for typical urban and suburban users, respectively (as an example). The appropriate power settings may be obtained by adjusting the number of amplifying stages in power amplifier 22, adjusting the amplifier gain switch point, tuning VBIAS, adjusting the settings of transceiver 20, etc.

Figure 5:
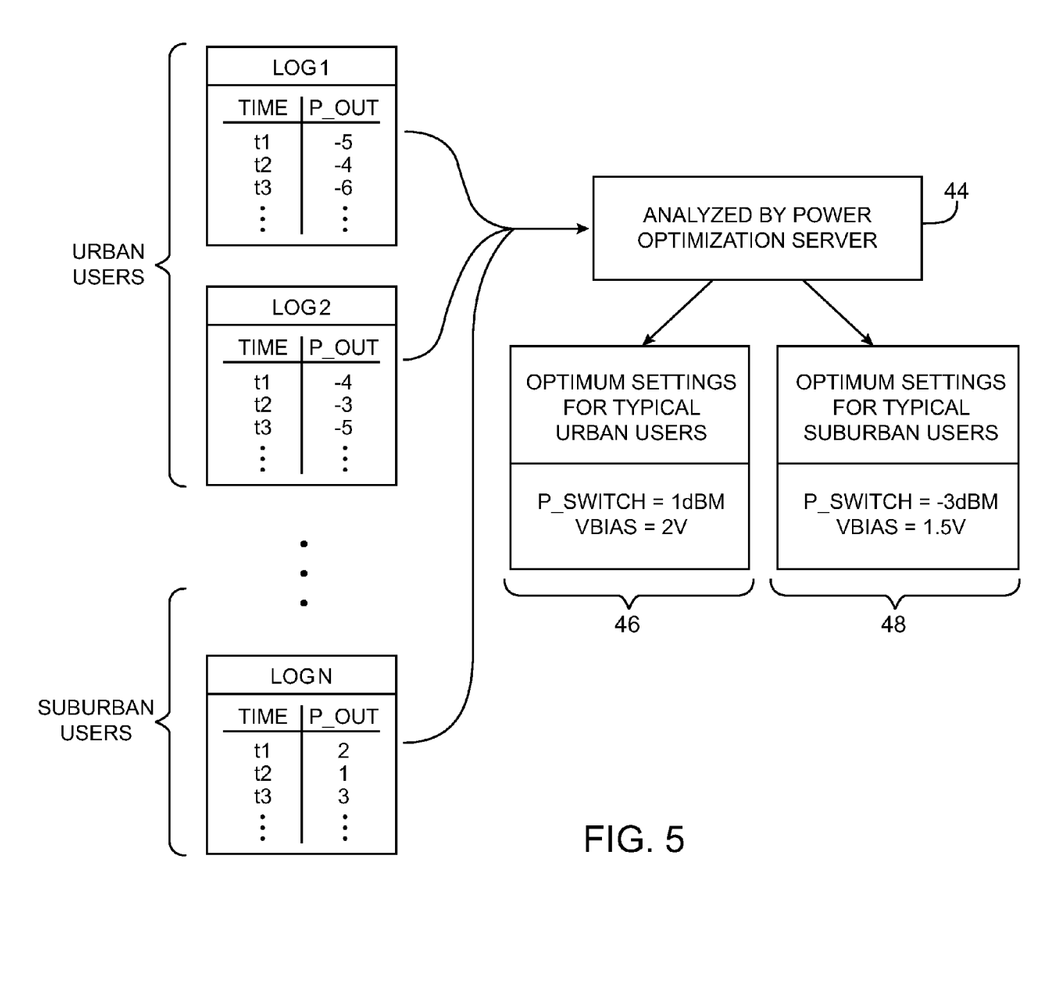
FIG. 5 is a diagram showing how logs or other stored usage data from different users may be analyzed to produce optimum power amplifier settings for use in different geographic regions in accordance with an embodiment of the present invention.

Once a device is configured to operate with a given set of desired optimum power settings, the transfer function of the device may remain fixed until a new set of power settings is configured. The actual transmit power of the device, however, may be adjusted by TPC commands that move the operating point of the device along the fixed transfer function. For example, once device 10 is configured with an urban power setting described in connection with FIG. 4, the amplifier gain switch point may be fixed at 1 dBm. The operating point of device 10 may, however, move along curves 40-1 and 40-2. TPC commands may only require device 10 to transmit power along curve 40-1 (as an example). Optimum transmit power settings may be obtained by aggregating logs of operating data from user devices, as shown in FIG. 5. FIG. 5 illustrates a simplified example in which two types of users are located in two separate regions. Urban users are located in an urban region and suburban users are located in a suburban region. Each user device may store a log. The log may be stored using storage 18 in each device 10. The log may record the transmit power level P_OUT at different points in time (e.g., t1, t2, t3, etc.). The transmit power of the urban user devices may vary about an average power of −5 dBm while the transmit power of the suburban user devices may vary about an average of 2 dBm, as an example. Each log may also keep track of the current location of the user device by analyzing the cell identifier broadcasted by the closest base station, by using the built-in GPS unit of device 10, or by using other location or region-based information. If desired, the quality (e.g., signal integrity) of a call may also be logged to help provide additional information. Signal quality may be measured using any suitable metric such as bit error rate, the frequency of dropped calls, signal strength (e.g., "bars" of strength), etc.

The logs of each user device may be aggregated and analyzed. Data analysis operations of this type may be performed using computing equipment. For example, these aggregation and analysis operation may be performed by a power optimization server during the operations of step 44 of the flow chart in FIG. 5. The power optimization server may compile a cumulative distribution function (CDF) for each separate region (see, e.g., FIGS. 2 and 3). Regions types may be identified in advance (e.g., urban and suburban) or the analysis operations of step 44 may be used in identifying suitable region types (e.g., hilly rural-suburban, sparse urban, etc.).

Different transmit power settings may be identified that are optimized for each different region. It may be desirable to have transmit power settings that ensure optimum performance when a device is operating at the peak of the CDF for each region or performance can be operated over the entire range of possible transmit powers using the CDF as a weighting function (as examples). Power settings 46 and 48 may be determined by analyzing the aggregated information during step 44. Power settings 46 that are supplied by the operations of step 44 may be the optimal transmit power settings for typical urban users. Power settings 48 that are supplied by the operations of step 44 may be the optimal power settings for typical suburban users. Power settings 46 and 48 may correspond to power transfer functions of the types described in connection with FIG. 4, as an example.

This is merely an illustrative example. The aggregation of wireless usage data from logs of different users in this way may be used to determine optimal power settings for users that are located in more than two different regions. The regions can be any desired size and may be selected using any suitable classification criteria. For example, optimal settings may be provided on a cell to cell basis, a city to city basis, a country to country basis, regions chosen based on general geography, etc.

Figure 6:
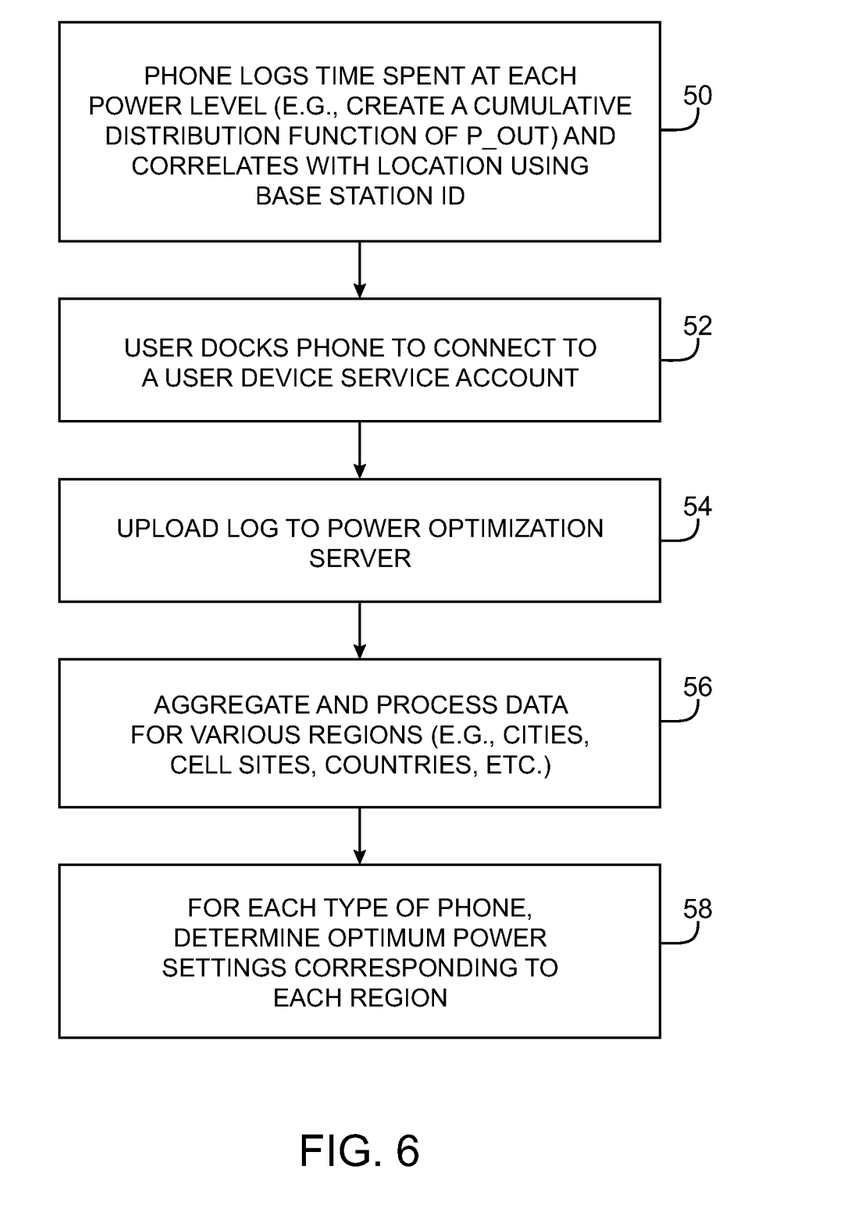
FIG. 6 is a flow chart of illustrative steps involved in gathering and analyzing data from user devices in accordance with an embodiment of the present invention.

Illustrative steps involved in performing the operations of step 44 of FIG. 5 are shown in the flow chart of FIG. 6.

At step 50, each user device logs the time spent at each transmit power level. Power level and time data may be maintained in storage 18 by storage and processing circuitry 12. Each data point may be tagged with the current region of the device. The current region in which the device is located may be determined from the base station identifier that is broadcasted by a neighboring base station or may be determined using GPS unit 34 (as examples). If desired, each user device may compile a CDF internally as the log is being update.

At step 52, a user may dock device 10 to connect the device to an online service such as a user device service account. The service may be implemented using a local application (e.g., an application running on a user's personal computer) and a remote application (e.g., a server application with which each local application communicates over the Internet. Once logged data from numerous users and geographic locations has been obtained and analyzed, the service may generate recommended settings to use in each region. The service may then be used to provide appropriate settings to device 10. During the process of uploading log data from device 10 to the service, the service may pull the log from the phone and forward the log to a power optimization server (step 54). The power optimization server may continuously receive and store incoming logs as each user docks device 10. The power optimization server may be implemented using one or more computers that are located at one or more geographic locations. The power optimization server and the service that is implemented on the power optimization server may be part of a larger service (e.g., a media download service) or may be associated with other services to which the user can connect device 10. In addition to retrieving logs and distributing optimum transmit power settings, the service may provide a medium through which music, games, applications and other items may be purchased or downloaded. The service may, for example, include the functions of the iTunes® digital media player application of Apple Inc. of Cupertino, Calif.

The power optimization server may aggregate and organize the data (i.e., the information in each log). Log data may be organized using predetermined regions or regions can be identified during the organization process. Data may be divided into cities, cell sites, countries, or any other suitable region size or type (step 56).

At step 58, the data may be further segmented according to the type (model) of device 10. The power optimization server (or other computer-implemented power optimization service) may determine an optimized transmit power setting for each type of device in each region. The power optimization server may calculate the optimized power settings based on a combined CDF of all the aggregated logs for each type of user device in each region. The optimum transmit power settings may correspond to the peaks of the combined CDFs (as an example). In operation, the transmit power of device 10 will vary depending on the TPC commands, but while varying, device 10 will generally be operating efficiently about the optimum transmit power setting for a certain region according to a transfer function that is specified by the optimum transmit power settings. Optimum settings may be stored on an online server or other computing equipment for subsequent downloading by users. Optimum settings may be downloaded over a wireless network (e.g., periodically, in real time, or whenever a user enters a new region), may be built into devices, and/or may be downloaded into devices when a user connects a device to a service (e.g., when syncing a device to a personal computer on which a client portion of a service is running).

Figure 7:
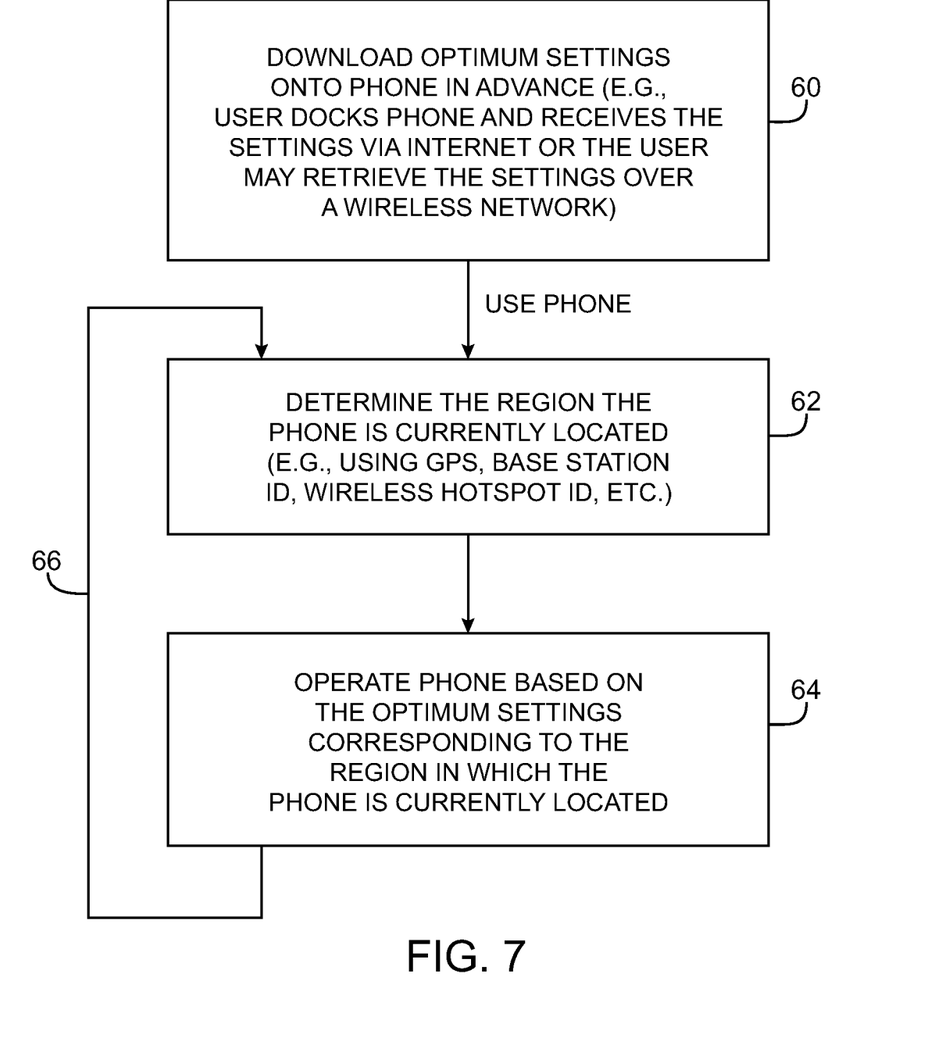
FIG. 7 is a flow chart of illustrative steps involved in obtaining and using optimum radio-frequency power amplifier settings in a given geographic region in accordance with an embodiment of the present invention.

FIG. 7 is a flow chart of illustrative steps involved in downloading the optimum transmit power settings onto user device 10. At step 60, device 10 may download in advance the optimum power settings while it is docked and is connected to the online service. Alternatively, device 10 may retrieve the optimum transmit power settings over a wireless network (e.g., when no connector port is available or when it is desired to receive real-time updates to the settings as the user travels between different regions of a network). Device 10 may download the optimum power settings for all the regions in the world or for all regions in a national network. If desired, device 10 may only download a subset of the optimum power settings to save memory. For example, a user who is a resident of California may only need to download a subset of the optimum transmit power settings optimized for a default region such as California, a metropolitan region in California, the North American continent, etc.

While device 10 is in use, device 10 may determine the region in which it is currently located (step 62). Device 10 may determine its current location by using built-in GPS unit 34, by using the base station identifier that is broadcasted by a neighboring base station, by using a local wireless hotspot identifier, etc.

After determining its current location, the user device may operate using the optimum power settings that correspond to its current location (step 64). In a scenario in which the phone only downloaded a subset of optimum power settings and the subset of optimum power settings does not contain the desired setting for the current location, the user may retrieve the desired power settings via a wireless network. For example, the user who is a resident of California may only download the optimum power settings for California or for the North American continent. The user may travel to China. The subset of optimum power settings that is initially resident in the user's device 10 does not include China (in this example). As a result, the user may have to download the optimum power settings corresponding to the Asia region via a wireless network. If desired, the user may dock his phone and select to download the desired optimum settings corresponding to regions other than the default region.

This process may loop back to step 62 as indicated by path 66. The power optimization server may constantly be collecting and aggregating data. The power optimization server, however, may only analyze and update the optimum power settings once every few months based on the current optimum transmit power settings and the newly collected data (i.e., user logs). The user may be notified when he docks the phone that new optimum settings are available for download.

If desired, the optimum settings may be selected based on information associated with the user (e.g., an associated region). For example, a user may provide the service with his current residence address or postal code to denote the associated region. Alternatively, the service may have a record indicating the associated region in which the phone was purchased or registered. The service may simply provide the device with an optimum transmit power setting that corresponds to the user's address, the region of registration, etc. If desired, the user device may download a complete lookup table (LUT) that has the optimum power settings for each corresponding postal code or region. The LUT may be stored in storage circuitry 18 (as an example).

Figure 8:
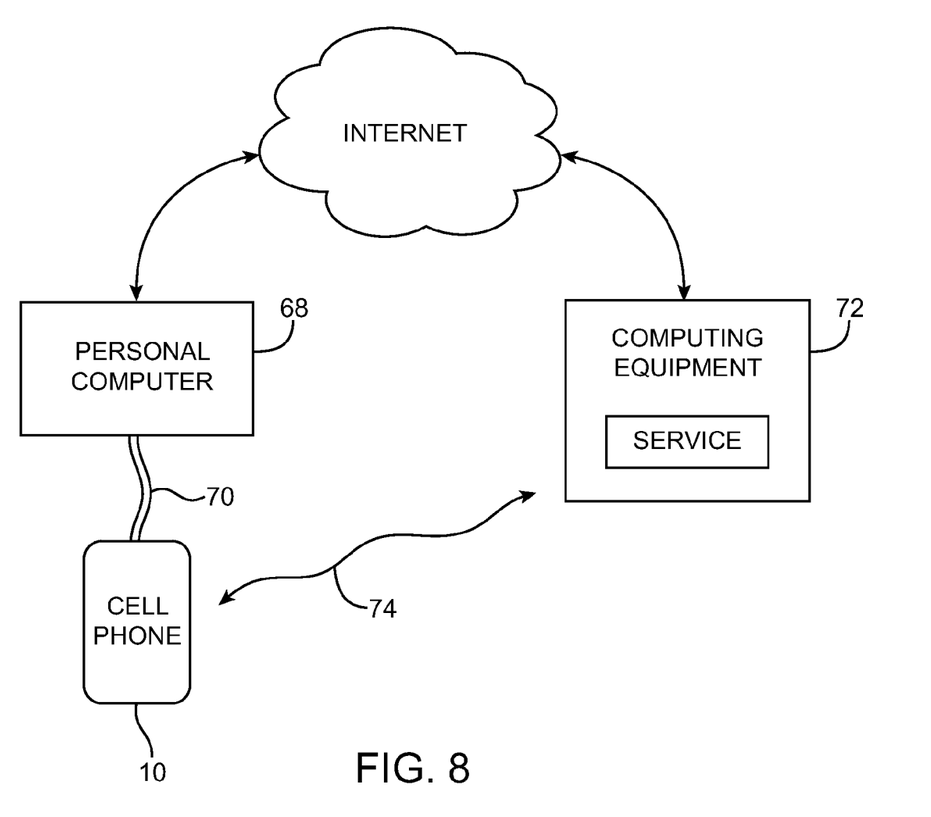
FIG. 8 is a diagram showing how a cellular telephone may send and retrieve information to and from an online service in accordance with an embodiment of the present invention.

FIG. 8 shows how a user device such as a cell phone may communicate with the online service. Device 10 may be docked to connect to a personal computer such as personal computer 68. Personal computer 68 may be running a client portion of the service. Device 10 may be connected to personal computer 68 through a connector such as connector 70. Personal computer 68 may be part of a computer network that is connected to the Internet. Personal computer 68 may be connected to the Internet using physical wiring (e.g., Ethernet technology) or using a suitable wireless communications protocol (e.g., Wi-Fi®).

Computing equipment such as computing equipment 72 may also be connected to the Internet. Computing equipment 72 may be running the service that can be used to update (sync) various user device settings. Device 10 may be docked in this way to send data (e.g., transmit power logs) to computing equipment 72 through the Internet. Computing equipment 72 may also send optimum transmit power settings, the latest carrier settings, and other information to the docked device through the Internet. If desired, device 10 need not be docked and may communicate directly with computing equipment 72 (as indicated by wireless propagation path 74 in FIG. 8).

The foregoing is merely illustrative of the principles of this invention and various modifications can be made by those skilled in the art without departing from the scope and spirit of the invention.

What is claimed is:

1. A method of using an online service implemented on computing equipment, comprising:
    aggregating logs from a plurality of wireless electronic devices using the online service, wherein each wireless electronic device is operable to transmit at a plurality of transmit power levels, wherein the log of each wireless electronic device includes information indicating the amount of time that wireless electronic device spends at each of the plurality of transmit power levels and is received from that wireless electronic device;

storing the logs that are aggregated from the plurality of wireless electronic devices using the online service on a power optimization server;

with the power optimization server, organizing the aggregated logs into a plurality of data sets, wherein each data set in the plurality of data sets corresponds to a respective geographical region;

with the power optimization server, calculating a plurality of cumulative distribution functions each of which corresponds to a respective data set in the plurality of data sets, wherein each cumulative distribution function in the plurality of cumulative distribution functions has at least one peak that corresponds to a radio-frequency transmit power level at which a typical wireless electronic device that resides in the corresponding geographical region spends the greatest amount of its time transmitting radio-frequency signals;

with the power optimization server, identifying optimum transmit power settings that correspond to the peaks of the plurality of cumulative distribution functions; and providing the identified optimum transmit power settings to the plurality of wireless electronic devices from the online service through a network.

2. The method defined in claim 1, wherein aggregating the logs from the plurality of wireless electronic devices comprises gathering the logs from the plurality of wireless electronic devices while the wireless electronic devices are docked to personal computers.

3. The method defined in claim 2, further comprising:
with the personal computers, running a client portion of the online service.

4. A method of using a service implemented on computing equipment, comprising:
gathering radio-frequency power amplifier data logs from a plurality of wireless electronic devices using the service implemented on the computing equipment, wherein each wireless electronic device is operable to transmit at a plurality of transmit power levels, wherein the data log gathered from each wireless electronic device in the plurality of wireless electronic devices includes information indicating how much time that wireless electronic device has spent at each of the plurality of transmit power levels and is received from that wireless electronic device;

generating a distribution function based on the information in the radio-frequency power amplifier data logs gathered from the plurality of wireless electronic devices, wherein the distribution function has at least one peak that corresponds to a transmit power level at which a typical wireless electronic device spends the greatest amount of its time transmitting radio-frequency signals;

obtaining optimum radio-frequency power amplifier settings for the plurality of wireless electronic devices by identifying the at least one peak of the distribution function; and with the service implemented on the computing equipment, providing the optimum radio-frequency power amplifier settings to at least some of the plurality of wireless electronic devices over a network.

5. The method defined in claim 4, wherein analyzing the radio-frequency power amplifier data logs comprises:
determining which of the radio-frequency power amplifier settings are optimal for a first type of geographic region; and
determining which of the radio-frequency power amplifier settings are optimal for a second type of geographic region that is different than the first type of geographic region.

6. The method defined in claim 5, wherein the first type of geographic region comprises a metropolitan region.

7. The method defined in claim 6, wherein the second type of geographic region comprises a suburban region.

\* \* \* \* \*